(12) United States Patent     (10) Patent No.:   US 12,589,437 B2

Aramesh                    (45) Date of Patent:      Mar. 31, 2026

(54) ULTRA SOFT CUTTING TOOL COATINGS AND COATING METHOD

(71) Applicant: McMaster University, Hamilton (CA)

(72) Inventor: Maryam Aramesh, Oakville (CA)

(73) Assignee: McMaster University, Hamilton (CA)

( * ) Notice: Subject to any disclaimer, the term of this patent is extended or adjusted under 35 U.S.C. 154(b) by 106 days.

(21) Appl. No.: 17/150,103

(22) Filed: Jan. 15, 2021

(65) Prior Publication Data

US 2021/0129230 A1      May 6, 2021

Related U.S. Application Data

(62) Division of application No. 16/383,157, filed on Apr. 12, 2019, now Pat. No. 11,389,879.

(60) Provisional application No. 62/656,439, filed on Apr. 12, 2018.

(51) Int. Cl.
    *C23C 26/00*       (2006.01)
    *B23B 27/14*       (2006.01)

(52) U.S. Cl.
    CPC ............ *B23B 27/148* (2013.01); *C23C 26/00* (2013.01); *B23B 2222/04* (2013.01); *B23B 2222/14* (2013.01); *B23B 2228/10* (2013.01)

(58) Field of Classification Search
    CPC .............................. C23C 26/00; B23B 27/148
    See application file for complete search history.

(56) References Cited

U.S. PATENT DOCUMENTS

| | | | |
|---|---|---|---|
| 4,525,417 A | 6/1985 | Dimigen et al. | |
| 4,724,169 A | 2/1988 | Keem | |
| 6,338,879 B1 | 1/2002 | Yasuoka | |
| 6,634,837 B1 * | 10/2003 | Anderson | ............... C22C 29/08 |
| | | | 407/119 |
| 8,034,438 B2 | 10/2011 | Sundstrom et al. | |
| 2005/0004602 A1 * | 1/2005 | Hart | ................... A61B 17/0487 |
| | | | 606/232 |

(Continued)

FOREIGN PATENT DOCUMENTS

| | | | |
|---|---|---|---|
| CN | 101403088 A | 4/2009 | |
| CN | 111826652 A * | 10/2020 | ............. C23C 26/00 |

(Continued)

OTHER PUBLICATIONS

ASM Handbook vol. 16: Machining ASM Handbook Committee p. 761-804 "Machining of Aluminum and Aluminum Alloys" (c) 1989 ASM International (Year: 1989).*

(Continued)

*Primary Examiner* — Nathan H Empie

(74) *Attorney, Agent, or Firm* — Smart & Biggar LP

(57)              ABSTRACT

A cutting tool, comprising a substrate having a cutting surface and a coating adhered to the cutting surface in a solid state, wherein the coating includes a soft metal and is capable of melting and functioning as an in-situ liquid lubricant when the cutting tool is applied in a machining operation. Also, a method of applying a coating to a cutting tool, comprising receiving a premachining workpiece, the premachining workpiece formed of a coating material including a soft metal; and machining the premachining workpiece with the cutting tool such that a layer of the coating material adheres to a cutting surface of the cutting tool in a solid state.

6 Claims, 10 Drawing Sheets

(56) References Cited

U.S. PATENT DOCUMENTS

| | | | | |
|---|---|---|---|---|
| 2007/0054146 A1* | 3/2007 | Aizawa | .................... | B23B 27/14 |
| | | | | 428/544 |
| 2015/0167176 A1 | 6/2015 | Hampsch et al. | | |
| 2019/0061010 A1 | 2/2019 | Fu et al. | | |

FOREIGN PATENT DOCUMENTS

| | | | | |
|---|---|---|---|---|
| JP | H06220571 | A | * | 8/1994 |
| JP | 2503544 | Y2 | * | 7/1996 |
| JP | 2002038255 | A | | 2/2002 |
| JP | 2002113604 | A | | 4/2002 |
| JP | 2007015106 | A | | 1/2007 |
| JP | 2013146819 | A | * | 8/2013 |

OTHER PUBLICATIONS

M. Xavior, M. Manohar, and P. Jeyapandiarajan, "Tool Wear Assessment During Machining of Inconel 718," Procedia, 2017.

K. Venkatesan, "The study on force, surface integrity, tool life and chip on laser assisted machining of inconel 718 using Nd:YAG laser source," J. Adv. Res., vol. 8, No. 4, pp. 407-423, Jul. 2017.

T. Sugihara, H. Tanaka, and T. Enomoto, "Development of Novel CBN Cutting Tool for High Speed Machining of Inconel 718 Focusing on Coolant Behaviors," Procedia Manuf., vol. 10, pp. 436-442, Jan. 2017.

B. Kursuncu, H. Caliskan, S. Y. Guven, and p. Panjan, "Wear Behavior of Multilayer Nanocomposite TiAISiN/TiSiN/TiAIN Coated Carbide Cutting Tool during Face Milling of Inconel 718 Superalloy," J. Nano Res., vol. 47, pp. 11-16, May 2017.

N. Narutaki, Y.Yamane, K.Hayashi, T.Kitagawa, and K.Uehara, "High-speed Machining of Inconel 718 with Ceramic Tools," CIRP Ann., vol. 42, No. 1, pp. 103-106, Jan. 1993. Abstract.

H.Attia, S.Tavakoli, R.Vargas, and V.Thomson, "Laser-assisted high-speed finish turning of superalloy Inconel 718 under dry conditions," CIRP Ann., vol. 59, No. 1, pp. 83-88, Jan. 2010.

* cited by examiner

100
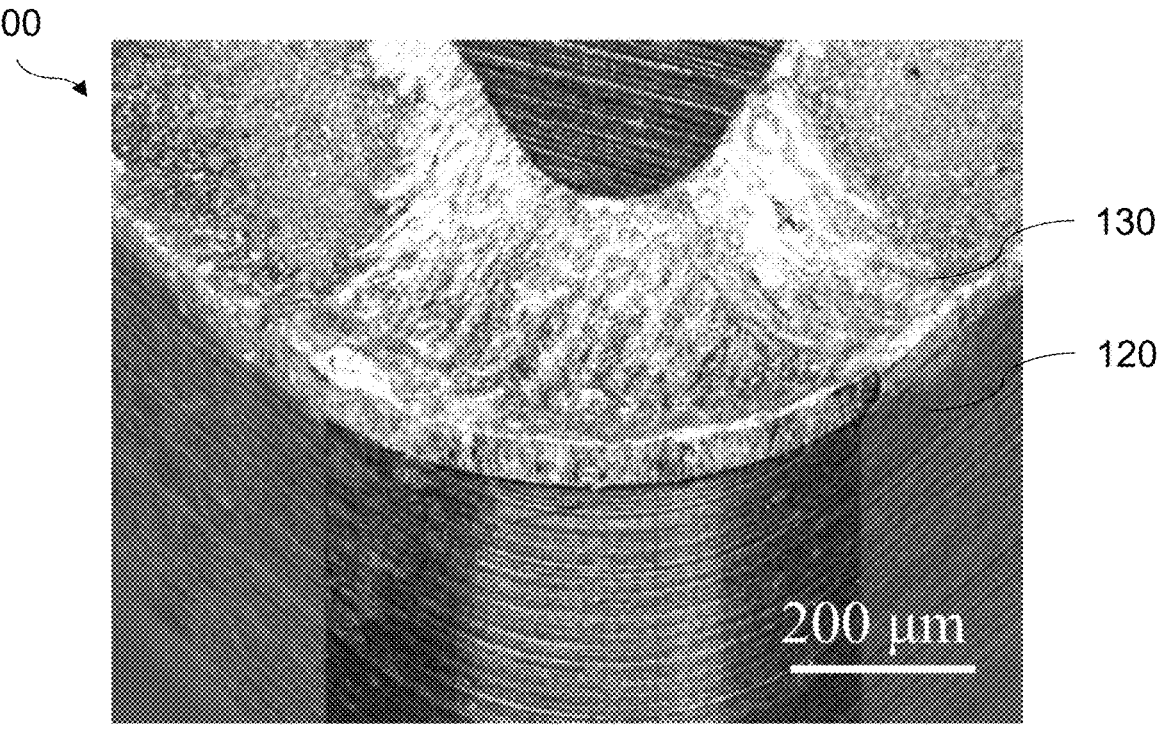
130
120
FIG. 1C
100
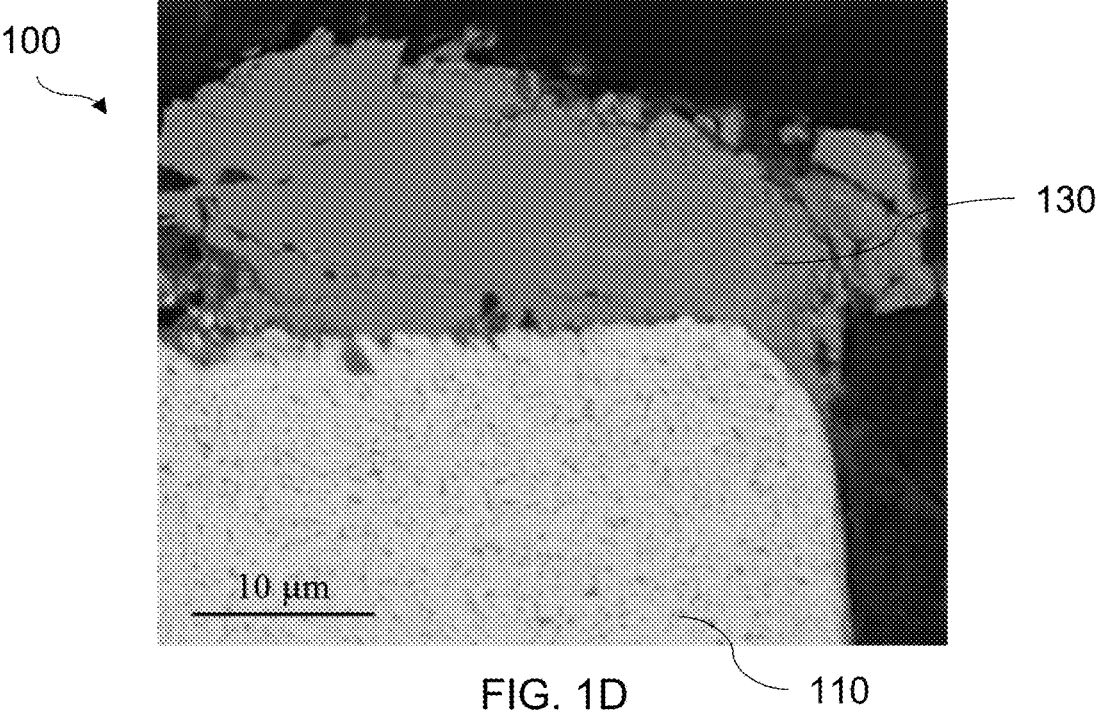
130
FIG. 1D          110

ULTRA SOFT CUTTING TOOL COATINGS AND COATING METHOD

This application is a division of U.S. patent application Ser. No. 16/383,157, filed Apr. 12, 2019, which claims the benefit of U.S. Provisional Application Ser. No. 62/656,439, filed Apr. 12, 2018, each of which is hereby incorporated herein by reference.

FIELD

The described embodiments relate generally to cutting tools, and specifically to a coated cutting tool and coating method.

BACKGROUND

Various types of cutting tools have been developed for removing material from a workpiece, including cutting tools for use in turning, cutting tools for use in boring, and cutting tools for use in milling.

While some cutting tools are used in a cutting operation without a coating, others have a coating applied prior to use, to reduce friction, wear and failure of tools.

During cutting very difficult to cut materials such as super alloys, tooling experiences severe seizure due to high thermal and mechanical loads which result in short cutting tool life. When cutting these materials, commonly a super hard coating is applied prior to use. However even these coatings cannot withstand such severe conditions and cannot protect the tool from chipping and failure.

SUMMARY

In a first aspect, some embodiments of the invention provide a cutting tool, comprising a substrate having a cutting surface; and a coating adhered to the cutting surface in a solid state, wherein the coating includes a soft metal and is capable of melting and functioning as an in-situ liquid lubricant when the cutting tool is applied in a machining operation.

In some embodiments, the machining operation heats the coating to an in-situ temperature of at least 800° C.

In some embodiments, the coating has a melting point below 800° C. at atmospheric pressure.

In some embodiments, the soft metal is aluminum.

In some embodiments, the coating further includes silicon.

In some embodiments, the coating includes between 50 and 95 percent by weight aluminum and between 5 and 50 percent by weight silicon.

In some embodiments, the coating further includes a top coating layer consisting of a plurality of spherical graphite particles.

In some embodiments, the coating further includes ductile cast iron.

In some embodiments, the machining operation involves machining a difficult to cut material.

In some embodiments, the cutting surface includes a rake face and a flank face and the coating is adhered to at least the rake face.

In some embodiments, the coating is capable of forming a plurality of tribofilms when the cutting tool is applied in a machining operation, the plurality of tribofilms including a thermal barrier tribofilm, and/or a ductile tribofilm, and/or a one low friction tribofilm.

In some embodiments, the coating is a residue of a premachining workpiece and is formed by machining the premachining workpiece.

In some embodiments, the cutting tool is used in extreme conditions of temperature and pressure.

In a second aspect, some embodiments of the invention provide a method of applying a coating to a cutting tool, comprising receiving a premachining workpiece, the premachining workpiece formed of a coating material including a soft metal; and machining the premachining workpiece with the cutting tool such that a layer of the coating material adheres to a cutting surface of the cutting tool in a solid state.

In some embodiments, machining the premachining workpiece includes at least one turning pass.

In some embodiments, machining the premachining workpiece continues for a premachining duration of less than three seconds.

In some embodiments, the coating material includes aluminum and silicon.

In some embodiments, the layer of coating material is capable of melting and functioning as an in-situ liquid lubricant when the cutting tool is applied in machining a product workpiece.

In some embodiments, following machining the premachining workpiece, the method includes machining a second premachining workpiece formed of a second coating material including a plurality of spherical graphite particles such that a layer of the second coating material adheres to the cutting surface of the cutting tool in a solid state.

In some embodiments, following machining the premachining workpiece, the method includes machining a target workpiece with the cutting tool such that the layer of the coating material forms a plurality of tribofilms.

BRIEF DESCRIPTION OF THE DRAWINGS

A better understanding may be had by referring to the accompanying figures provided by way of illustration of an exemplary embodiment, or embodiments, and in which:

FIG. 1A is a perspective view of a cutting tool;

FIG. 1C is a perspective view of the cutting edge of FIG. 1B with a coating applied, according to an embodiment;

FIG. 1D is a cross-sectional view of the cutting edge of FIG. 1C;

FIG. 4C are side elevation view of three example cutting tools, showing flank face wear;

DESCRIPTION OF EXEMPLARY EMBODIMENTS

Figure 1B:
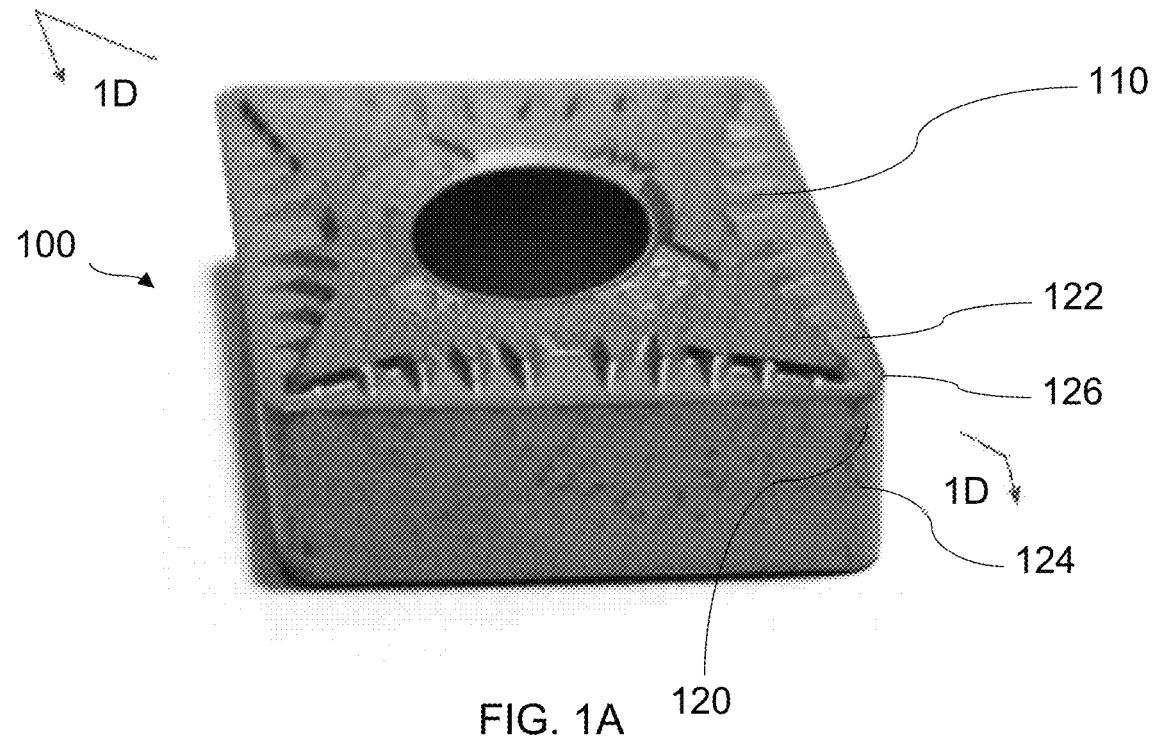
FIG. 1B is a perspective view of a cutting edge of the tool of FIG. 1A.
Figure 1B:
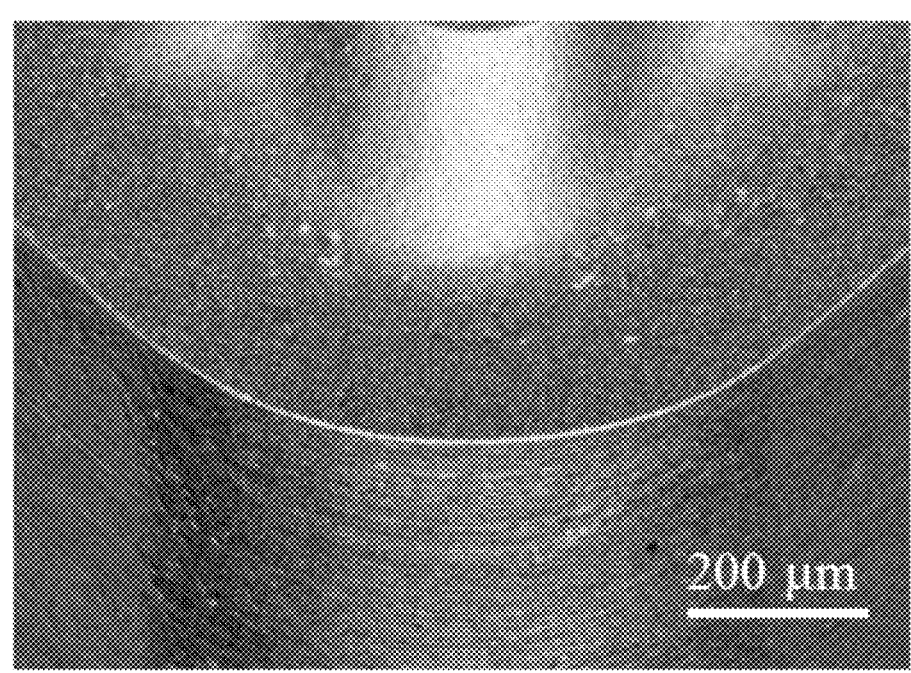

It will be appreciated that numerous specific details are set forth in order to provide a thorough understanding of the example embodiments described herein. However, it will be understood by those of ordinary skill in the art that the embodiments described herein may be practiced without these specific details. In other instances, methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

A cutting tool has a substrate. A substrate may be a base body of a cutting tool made of a cutting tool material such as cemented carbide, polycrystalline diamond, or cubic boron nitride. A substrate may also include one or more coatings such as a diamond-like carbon coating, or a titanium nitride coating.

A substrate has a cutting surface. The cutting surface of cutting tools includes a rake face defining a rake angle and a flank face defining a clearance angle, the rake face and the flank face meeting at a cutting edge.

FIGS. 1C and 1D depict cutting tool 100 with a coating 130 adhered to cutting surface 120. Coating 130 is a single layer coating of Aluminum Silicon alloy in a solid state, the Aluminum Silicon alloy being 90% Aluminum and 10% Silicon by weight. As depicted in FIG. 1C, coating 130 is adhered to a substantial portion of rake face 122 near cutting edge 126 in a layer approximately 40 μm thick. For example, coating 130 may be formed on the cutting surface 120 through cutting of Aluminum Silicon with the cutting tool 100, as described below.

Embodiments of a coated cutting tool can be applied in cutting a variety of materials, but are of particular use in machining operations which generate extreme temperatures and pressures. Extreme temperatures and pressures are those temperatures and pressures sufficient to melt a coating containing soft metal. Difficult to cut materials are materials for which typical cutting conditions result in extreme temperatures and pressures, such as super alloys. For example, the coated cutting tool can operate at temperatures up to 1200° C. and pressure up to 1 GPa. For example, a coated cutting tool may be used in cutting difficult to cut materials such as nickel-based super alloys and titanium, the machining of which routinely generates high temperatures and pressures.

In embodiments, the coating becomes molten during machining operations which generate extreme temperatures and pressures, and the molten coating functions as an in-situ liquid lubricant.

Figure 2A:
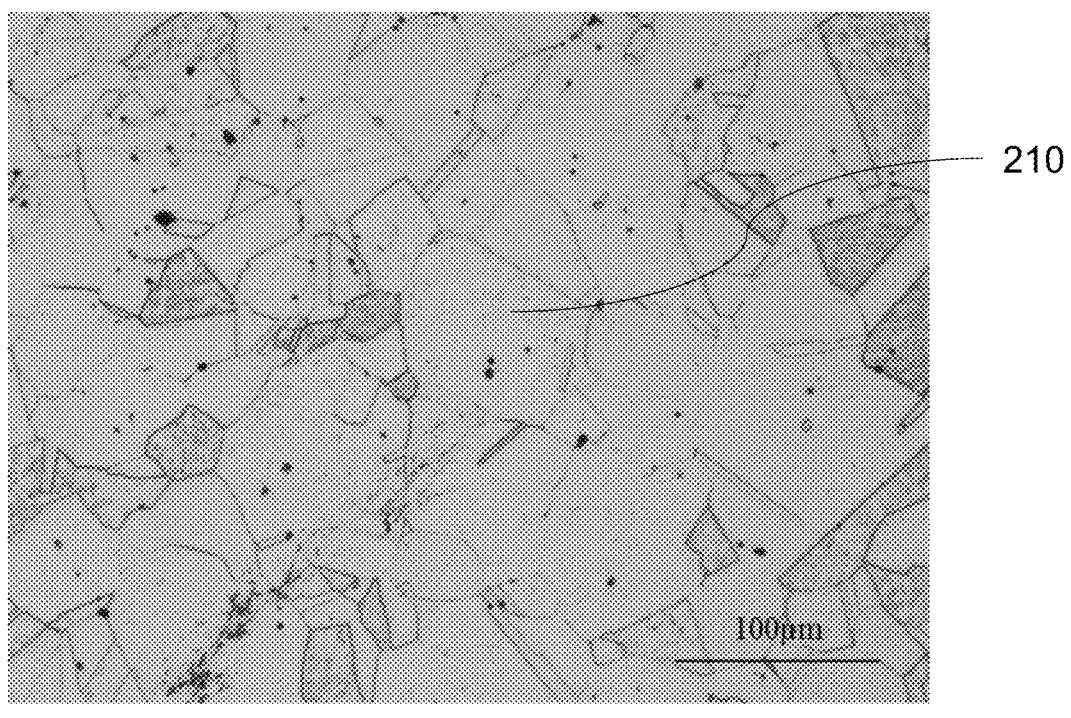
FIG. 2A is an image of the microstructure of Inconel 718.
Figure 2B:
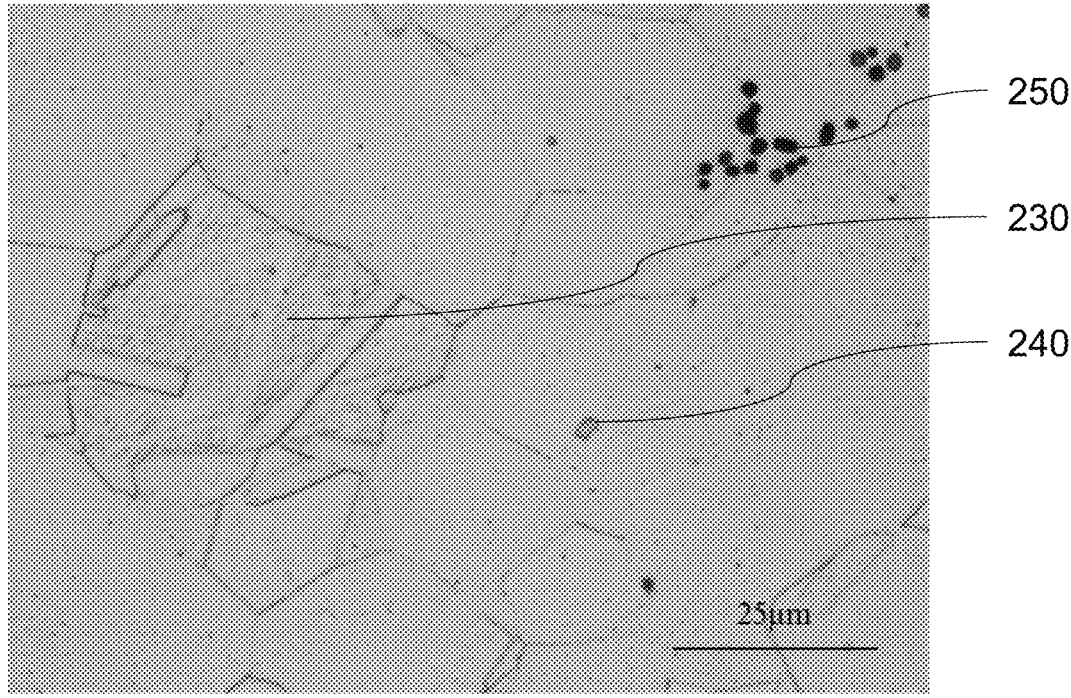
FIG. 2B is an image of the microstructure of Inconel 718.

FIGS. 2A and 2B depict a surface of nickel-based super alloy Inconel 718. Inconel 718 has a surface hardness of around 32 to 36 HRC and a chemical composition as set out in Table 1. The matrix phase of Inconel 718 is a gamma (γ) 210 as a face-centered cubic (FCC) austenitic phase which contains the specific amount of solid solutions such as Fe, Cr, and Mo. There are two strengthening phases precipitated in the grains. These two precipitated phases are a nickel aluminum titanium (Ni₃(Al Ti)), known as a gamma prime (γ') 230, and a nickel niobium (Ni₃Nb) phase, known as gamma double prime (γ") 230. The Inconel 718 also contains carbide particles such as niobium carbide 240 and titanium carbide 250 which are precipitated at the grain boundaries. These carbide particles at the grain boundaries can result in severe abrasive wear and also result in high cutting forces.

TABLE 1

Chemical composition of Inconel 718
Table 1 Chemical composition of Inconel 718

| | Ni | Cr | Fe | Mo | Nb | Ti | Al | Cu | Mn | Si | C | S | Co | P | Ta | B |
|---|---|---|---|---|---|---|---|---|---|---|---|---|---|---|---|---|
| Inconel 718 | 55.6 | 17.2 | 15.65 | 2.9 | 5.24 | 1 | 0.6 | 0.3 | 0.35 | 0.35 | 0.08 | 0.015 | 1 | 0.015 | 0.05 | 0.006 |

FIGS. 1A and 1B depict a cutting tool 100 having a substrate 110. Substrate 110 forms a cutting surface 120 having a rake face 122 and a flank face 124 meeting at a cutting edge 126.

In some embodiments, a cutting tool has a coating adhered to the cutting surface in a solid state. In some embodiments, a coating has a thickness of between 0.5 and 45 μm and is applied in a substantially uniform layer across the coated portions of the cutting surface.

A coating includes one or more elements, including a soft metal. A soft coating is a metal having lower hardness than the tool substrate materials.

Figure 3:
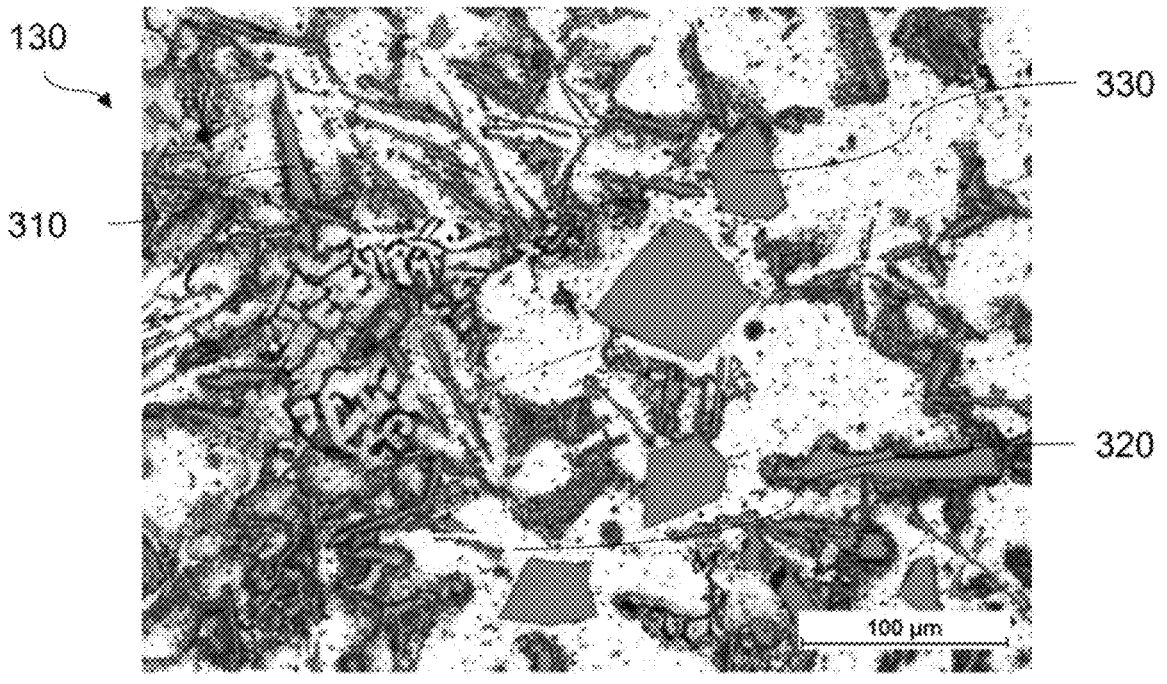
FIG. 3 is an image of the microstructure of an aluminum silicon alloy.

Coating 130 of cutting tool 100 is a single layer coating of Aluminum Silicon alloy. The microstructure of coating 130 is shown in FIG. 3. As shown in FIG. 3, coating 130 includes eutectic Si particles 310, α-Al phase 320, and primary silicon particles 330. Coating 130 contains hard and brittle Si particles in a soft Al matrix, and is has a low melting point, low coefficient of friction, good ductility, and high reaction to oxygen. The Si in the alloy promotes the formation of beneficial Si-based tribofilms during high-temperature machining. A low percent by weight of Si alleviates its machinability issues and may be more cost-effective. A cost-effective grade of Al—Si with a low amount of Si (10%) was selected for coating.

A coating may be applied in a number of different ways. In some embodiments, a coating is applied using known techniques such as Physical Vapor Deposition (PVD). In some embodiments, a coating is applied by using a cutting tool to premachine a workpiece formed of a coating material so that a layer of the coating material adheres to the cutting surface of the cutting tool in a solid state. After forming the coating on the tool surface by premachining the premachining workpiece material the cutting tool may be used for machining a product workpiece material to create a machined product. For example, a product workpiece material may be a workpiece of Inconel 718.

FIGS. 4A to 4H depict the performance of three cutting tools used to machine a product workpiece of Inconel 718. Compared are the performance results 512, 522, and 532 of tools 514, 524, and 534, respectively. Tool 514 is an uncoated cutting tool tested as a benchmark. Tool 524 is coated with a monolayer coating using PVD, resulting in a 1 μm layer of coating 130 having a harness measured at 2.4 GPa. Tool 534 is coated with a monolayer coating using a turning cut of a workpiece (premachining the workpiece), the turning cut having a duration of approximately two seconds and resulting in a layer of approximately 40 μm of coating 130. All cutting tools included an uncoated tungsten carbide substrate, such as substrate 110.

When cutting tools 524 and 534 were applied in machining a product workpiece of Inconel 718, the coating 130 was molten due to the high temperatures generated and the molten coating 130 acted as an in-situ lubricant and protected the tool from chipping and wearing out.

As indicated by the performance results of FIGS. 4A to 4I, coating 130 resulted in a number of performance improvements, whether applied by PVD or by premachining. The contact pressure was significantly reduced, resulting in significant reduction in abrasive wear. The sliding of the tool on the low friction layer of coating 130 resulted in much lower forces, less sticking, seizure and built-up edge formation and, thereby, in less tool wear and chipping. The molten coating 130 channeled itself through the microcracks on the surface of substrate 110 and seized their propagation. Several beneficial lubricious and thermal barrier tribofilms were also formed on cutting surface 120, which further protected the tool from chipping and severe tool wear. Reducing the contact pressure, friction and temperature during machining resulted in considerable reduction in the machining induced work-hardening of the target workpiece. The ductility of Aluminum helped to dampen the vibrations during machining and improved tool chipping prevention. Finally, tool wear at the running-in stage was lowered. Considerable improvements in the surface integrity of the machined part were also realized.

In testing tool 514, series of short cuts were performed on Inconel 718 until the tool failure criterion was reached. During machining of Inconel, the tool wear was measured after each short cutting pass. In testing tools 524 and 534, the coated tools were each used to machine a product workpiece of Inconel 718 until the end of tool life. The end of tool life was defined by the first of either chipping or a maximum flank wear length of 0.3 mm. For each of tools 514, 524, and 534 the tool morphology was examined and tool wear value was measured, and the results of these tests are presented in FIGS. 4A to 4I.

Figure 4A:
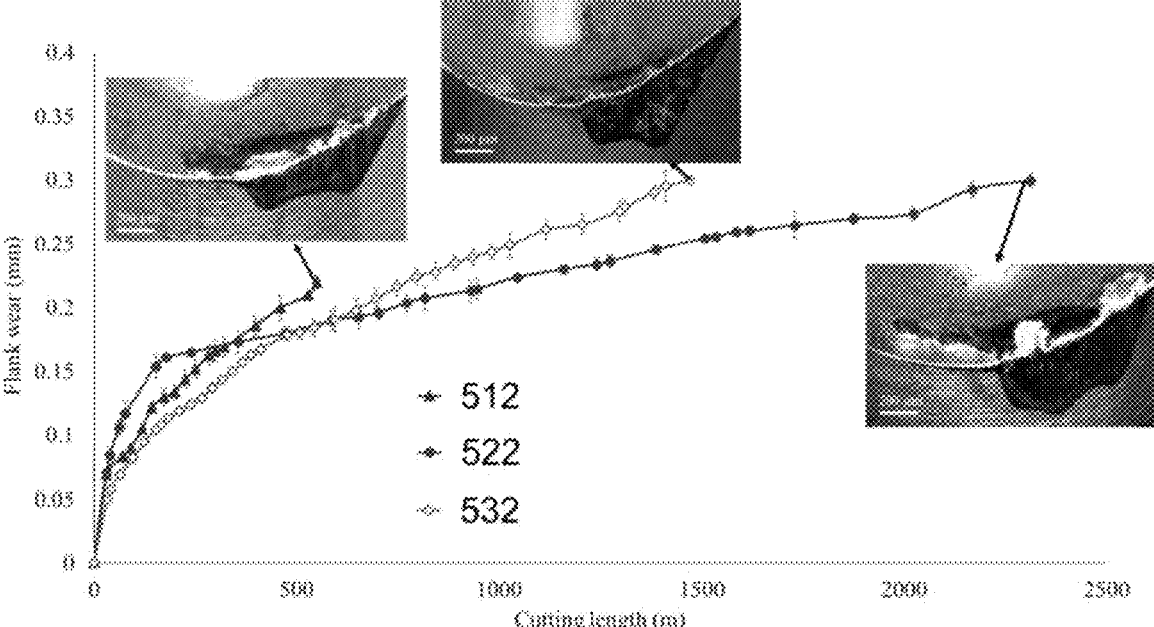
FIG. 4A is a graph of cutting tool flank wear versus cutting length for three example cutting tools.

FIG. 4A depicts tool wear results until the end of tool life. As shown, tool 514 failed between 400 and 600 meters of cut on average. Tool life was substantially extended for tools incorporating coating 130. As shown, use of tool 524 resulted in higher tool life improvement around 321% and use of tool 534 resulted in higher tool life improvement around 205%.

Figure 4B:
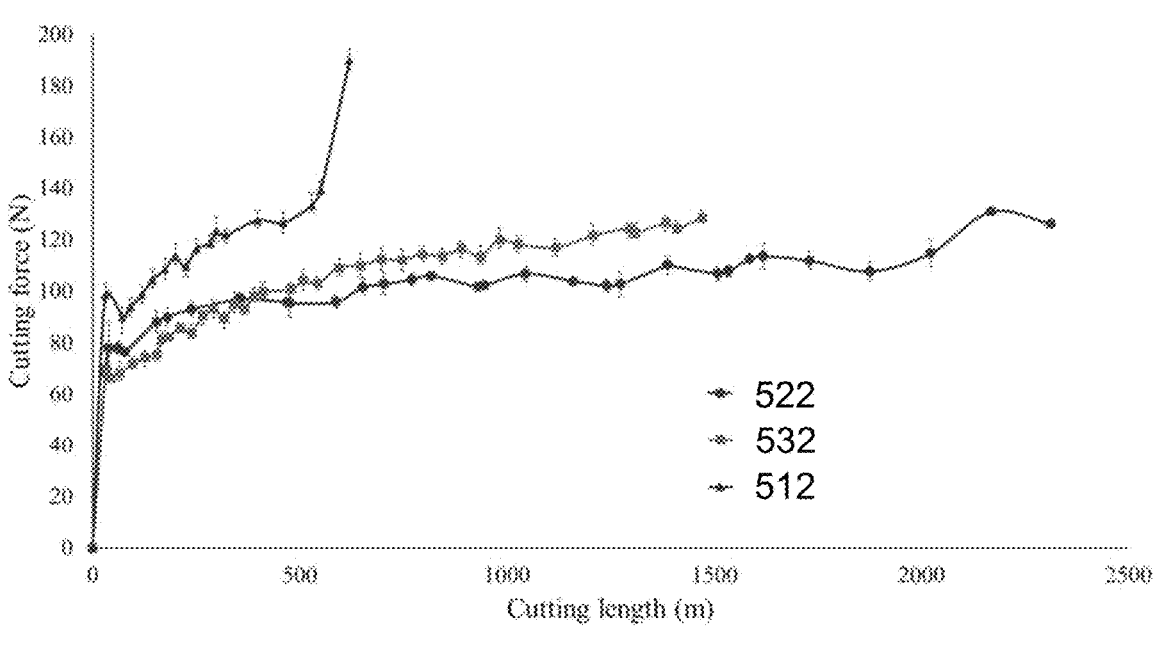
FIG. 4B is a graph of cutting tool force versus cutting length for three example cutting tools.

FIG. 4B depicts cutting force results until the end of tool life. As shown, use of tool 534 resulted in cutting forces of 40 to 50% less than use of tool 514. Use of tool 524 resulted in cutting forces of around 30% less than use of tool 514.

The left image of FIG. 4C depicts a flank face of tool 514 after 68 meters of cut, the central image of FIG. 4C depicts a flank face of tool 524 after 730 meters of cut, and the right image of FIG. 4C depicts a flank face of tool 534 after 2350 meters of cut. As shown, relatively deep grooves were formed in tool 514, indicating severe abrasive wear. Considerable notch wear also formed on tool 514, making it more susceptible to chipping. An excessive built up edge has also formed on the rake face of tool 514, also making it more susceptible to chipping.

The performance improvements resulting from the use of coating 130 is attributed to a number of consequences of the use of coating 130.

Figure 4D:
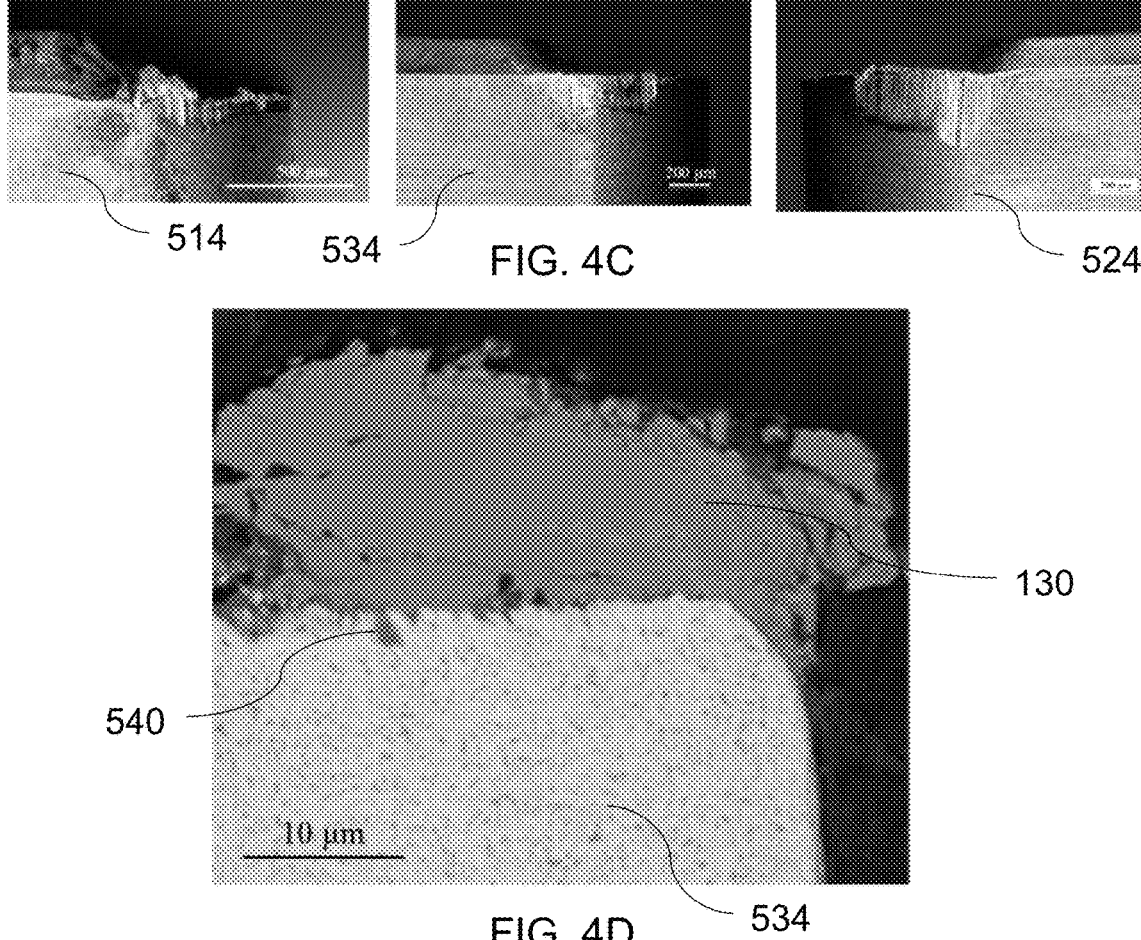
FIG. 4D is a cross-sectional view of the cutting edge of FIG. 1C.

Cracks are one of the most important precursors to chipping, yet the coating 130 deposited on the tool will be molten during machining of Inconel 718 as the coating 130 is brought to a temperature above 800° C. During testing of tool 534 the temperature was measured around 850° C. Molten coating 130 flows on the cutting surface 120 and fills pre-existing defects in the substrate 110 and small defects generated during machining of Inconel 718, preventing further crack propagation and chipping. FIG. 4D depicts a cross section of tool 534 prior to machining the product workpiece (Inconel 718), showing microcracks 540 filled with coating 130 due to the forces applied during the premachining turning cut due to the high fluidity of coating 130.

Figure 4E:
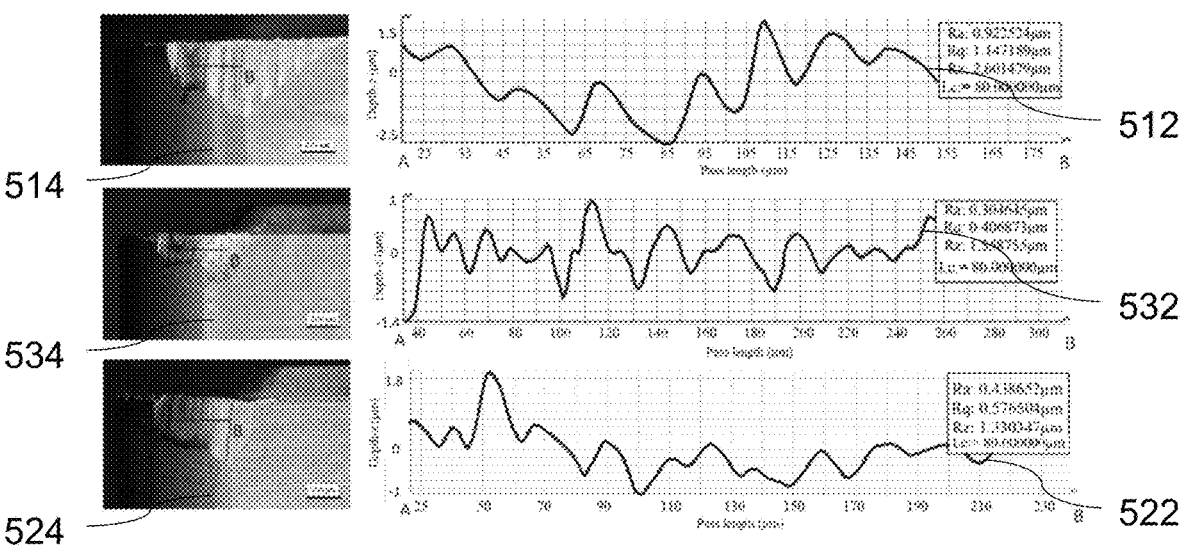
FIG. 4E are side elevation views of three example cutting tools showing flank face wear, and surface roughness graphs for the three example cutting tools.

During machining of Inconel 718 coating 130 is molten and the thin film formed between contact surfaces acts as an in-situ liquid lubricant and develops a hydrodynamic pressure between the contact bodies which results in lower contact pressure and their separation. This is indicated by the reduced surface roughness of tools 524 and 534 after machining Inconel 718. The top row image and graph of FIG. 4E depict the flank surface roughness of tool 514, the central row image and graph of FIG. 4E depict the flank surface roughness of tool 524, and the bottom row image and graph of FIG. 4E depict the flank surface roughness of tool 534. As the pressure on the abrasive particles is released, they penetrate the tool surface less and fewer grooves are made. Severe scratches and grooves as a result of two body and three body abrasion wear, in addition to the significant notch wear on tool 514 can be seen in the top row image and graph of FIG. 4E. On average the $R_a$ and $R_z$ of the flank surface of tool 514 after around 500 m of cut were ~1 and 2.6 μm, respectively, while, the values for tool 534 were ~0.3 and 1.5 μm. The values for tool 524 were 0.4 and 1.3 μm respectively. Measurements were made using an Alicona microscope.

Figure 4F:
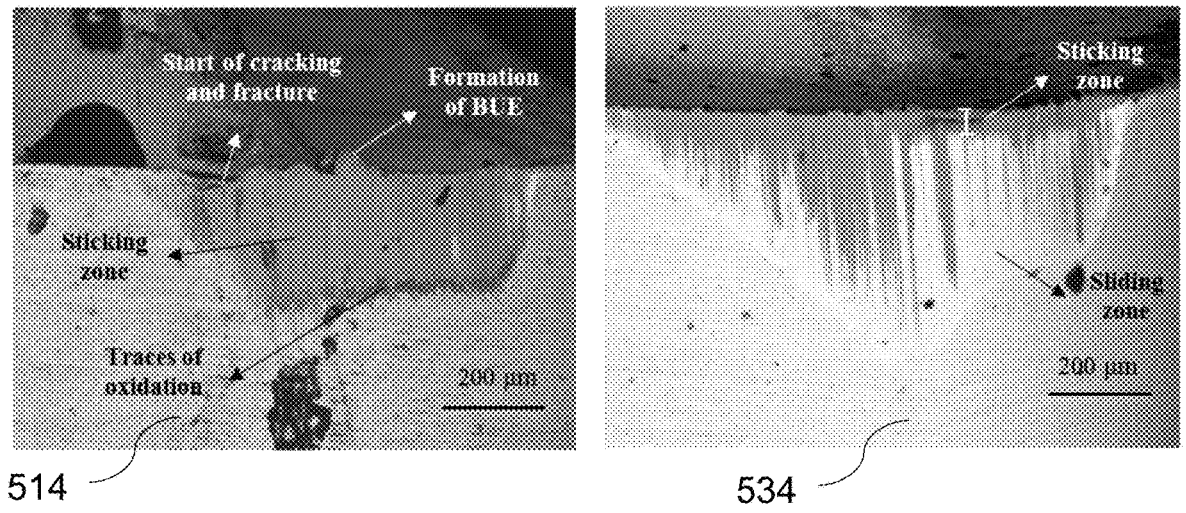
FIG. 4F are side elevation views of two example cutting tools showing flank face wear.

High friction, temperatures and contact pressures during machining can result in seizure and severe sticking and formation of built up edge on a tool surface. As shown, the high lubricity and thermal diffusivity of coating 130 resulted in less friction and lower temperatures during machining, and significant improvements in controlling the seizure and built up edge formation. This phenomenon can be seen in FIG. 4F. The left image of FIG. 4F is a backscattered image of the flank face of tool 514 after 500 meters of cut while the right image of FIG. 4F is a backscattered image of the flank face of tool 534 after 1550 meters of cut. Considerably more built up edge formation, sticking, and cracks can be observed on tool 514. Though the length of the cut tool 514 was used for almost ⅓ of the cut distance that tool 534 was used for, the sticking zone is much larger and extended to almost the whole contact zone. Results similar to those of tool 534 were observed for tool 524.

Figure 4G:
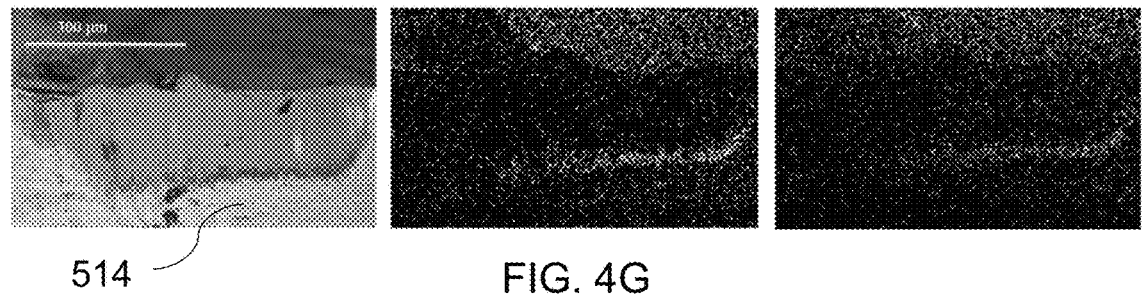
FIG. 4G are side elevation views of an example cutting tool showing flank face wear, a corresponding oxygen map, and a corresponding aluminum map.

Lower temperature in machining also affects chemical wear mechanisms, including oxidation wear. Oxidation wear was significantly reduced for tools 524 and 534. In almost all the samples examined, energy-dispersive x-ray spectroscopy (EDS) and elemental mapping of the tool face, revealed traces of oxidation around the contact area during testing of tool 514 which was not observed for tools 524 or 534. The left image of FIG. 4G is a scanning electron microscopy (SEM) image of the flank face of tool 514 after a linear distance of 500 meters of cut, the central image of FIG. 4G is an oxygen map of the left image, and the right image of FIG. 4G is an aluminum map of the left image. As may be observed, oxidation wear has occurred on tool 514.

Figure 4H:
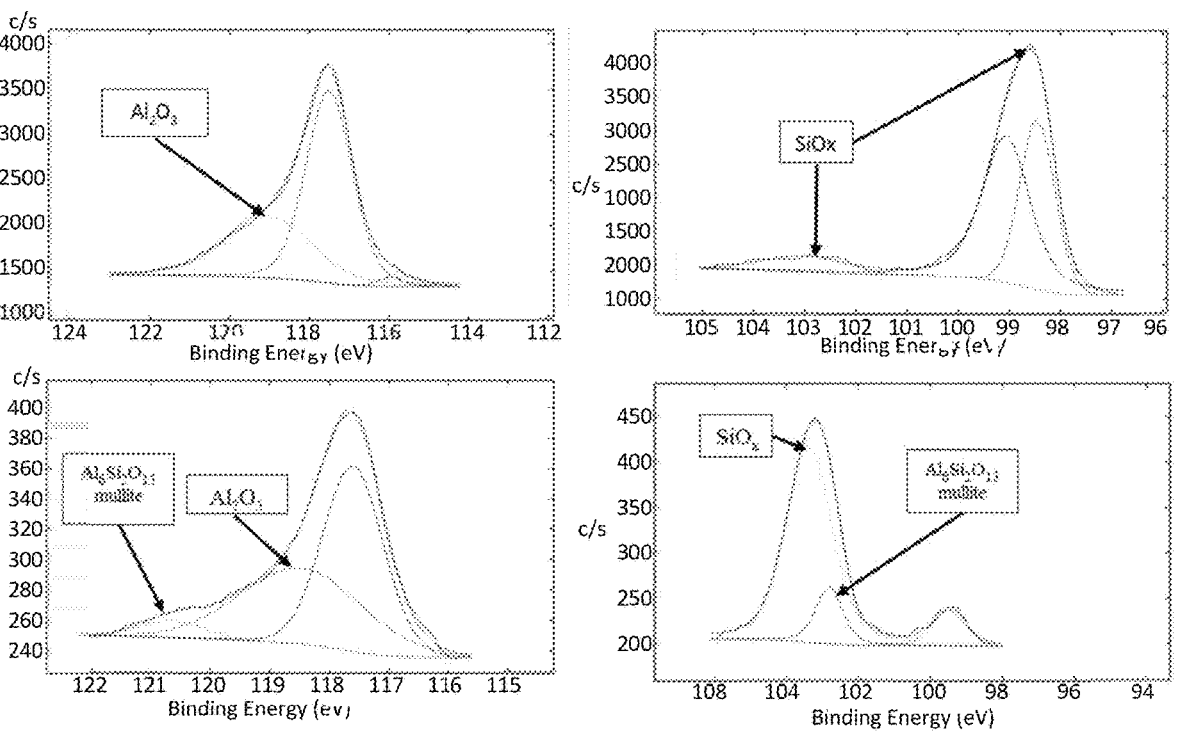
FIG. 4H are graphs showing XPS spectra of an example cutting tool.

Compatibility of coating 130 with the tool-workpiece tribosystem resulted in the formation of various beneficial tribofilms. The top left graph of FIG. 4H is an $Al_2S$ spectra of tool 534 after premachining but before machining the product workpiece, the top right graph of FIG. 4H is an $Si_2p$ spectra of tool 534 after premachining but before machining the target workpiece, the bottom left graph of FIG. 4H is an $Al_2S$ spectra of tool 534 after machining the target workpiece for 1550 meters, and the bottom right graph of FIG. 4H is an $Si_2p$ spectra of tool 534 after machining the target workpiece for 1550 meters. Aluminum Silicon possesses high compatibility with oxygen to form beneficial tribofilms on the tool-workpiece interface. Results confirm the presence of metallic Al and $Al_2O_3$ phases in addition to high temperature lubricant SiOx-tribo-phases. Both sapphire and mullite tribo-ceramic films have low thermal conductivity, and thus act as protective thermal barriers on the rake tool face and result in lower transfer of heat to the tool. On the other hand, lubricious SiOx tribo-phases contribute to higher lubricity, lower friction and thereby to overall improved wear behavior of the system. The lubricious and thermal barrier films generated during machining protected the tool from seizure and built up edge formation and contributed to reduce tool chipping and prevented rapid tool failure. FIG. 4H also indicates that a substantial amount of the mentioned tribofilms existed on tool 534 at the end of its tool life. Even after more than 1500 meters of cut, a high amount of aluminum and silicon remained in the tribosystem, contributing to various wear reduction mechanisms resulting in less chipping and tool wear.

Figure 4I:
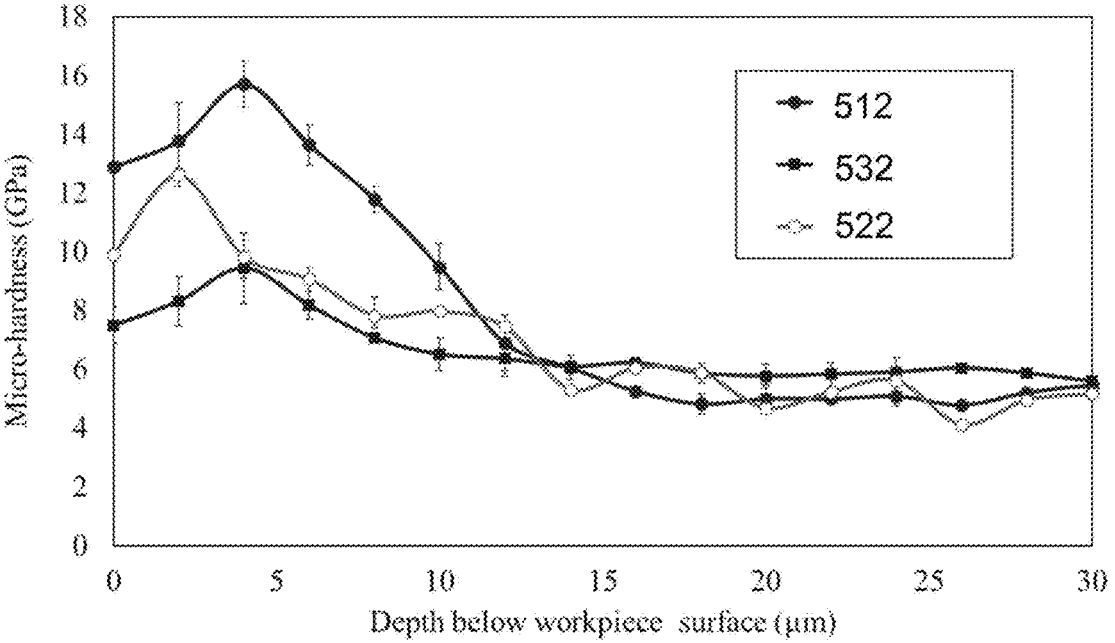
FIG. 4I is a graph of the micro-hardness of a cut target workpiece by depth below the workpiece surface following machining by three example cutting tools.

Coating 130 also reduced the work-hardening of Inconel 718 during machining, by controlling the friction, temperature and contact pressures. FIG. 4I shows the nano-hardness profile of the machined subsurface, showing around a 45% reduction in work-hardening of the product workpiece material for tool 534. An improvement of 25% was achieved for tool 524. Work hardening significantly affects the overall machinability of Inconel 718.

The high ductility of coating 130 resulted in damping of the initial shock and of machining vibration and, thus, can be very helpful in preventing tool chipping, especially where the brittleness of the tool and intermittent nature of the cut are of concern.

Further, preconditioning a contact surface, such as was done with tool 534, can improve the running-in stage and consequently the overall performance of the tribosystem. The premachining pre-sliding of the cutting surface of tool 514 on the workpiece improved the tribological properties of the system resulting in higher performance and enhanced machinability of the product workpiece of Inconel 718.

Figure 5:
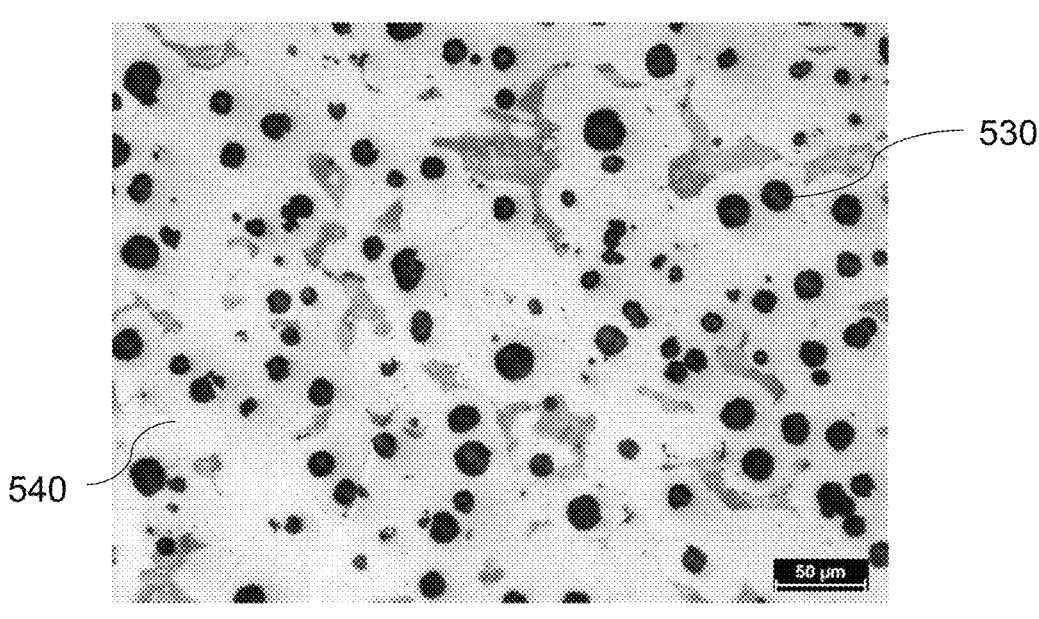
FIG. 5 is an image of the microstructure of a ductile cast iron.

In some embodiments, a coating also includes one or more additional coating layers, such as a lubricious layer. An example of a lubricious layer is cast iron. Cast iron consists of spheroidal graphite particles which are evenly distributed in a ferrite and/or pearlite matrix. FIG. 5 shows the microstructure of cast iron. Due to the presence of graphite nodules in cast iron's microstructure, it possesses high ductility, strength, and also excellent wear resistance. The graphite present in cast iron has a very beneficial effect on the friction coefficient as graphite is lubricious and it provides a self-lubricating base in many applications. In some embodiments, lubricious material such as cast iron may be formed on top of the soft metal layer.

In some embodiments, more than one premachining workpiece is used and more than one layer is added to form a coating. For example, an aluminum silicon workpiece may be used to form a first layer of a coating, followed by a cast iron workpiece to form a second layer of a coating.

FIGS. 6A to 6E depict the performance of four cutting tools used to machine a target workpiece of Inconel 718. Compared are the performance results 612, 622, 632, and 642 of tools 614, 624, 634, and 644, respectively. It may be noted that tool 614 and tool 514 are the same, as are tool 624 and tool 524. Tool 614 is an uncoated cutting tool tested as a benchmark. Tool 624 is coated with a monolayer coating using a turning cut of an aluminum silicon alloy workpiece. Tool 634 is coated with a monolayer coating using a turning cut of a cast iron workpiece. Tool 644 is coated with a layer of aluminum silicon alloy by a first turning pass of an aluminum silicon premachining workpiece and is coated with a layer of ductile cast iron by a second turning pass of a ductile cast iron premachining workpiece. The tool substrate for each tool was a tungsten carbide tool with a rake angle of 5° and a nose radius of 0.4 mm.

In some embodiments, a layer of coating is a thin and uniform layer of coating to decrease the probability of tool chipping. In addition, in some embodiments the thin layer covers the entire cutting engagement zone on the tool when it is subsequently used to machine a product workpiece. Full coverage assists in ensuring that the edge is protected from chipping and notch wear. To provide this uniform layer, a high cutting speed and a low feed rate are used in applying coatings to tools 624, 634, and 644. A high depth of cut is also selected to increase coverage. Cutting parameters for premachining turning cuts for tools 624, 634, and 644 are shown in the bottom two rows of values of Table 2. The top row of values of Table 3 sets out the cutting parameters used during machining of Inconel 718 in acquiring the performance results depicted in FIGS. 6A to 6E. Since aluminum is softer than cast iron, the selected cutting speed for aluminum was higher. The total cutting time used for the treatment process was very short. The minimum cutting time which provided the thin build up layer was desired to avoid wearing the tool. For each premachining workpiece the cut time was around 2 s. To receive both aluminum silicon and cast iron, tool 644 was cut using the procedure of tool 624 followed by the procedure of tool 634.

TABLE 2

| Cutting parameters | | | |
| --- | --- | --- | --- |
| | Cutting parameters | | |
| | Cutting speed (m/min) | Feed rate (mm/rev) | Depth of cut (mm) |
| Benchmark/actual machining | 50 | 0.1 | 0.15 |
| Treated tools    Al-10% Si | 450 | 0.06 | 1 |
|                 Cast iron | 250 | 0.06 | 1 |

Figure 6A:
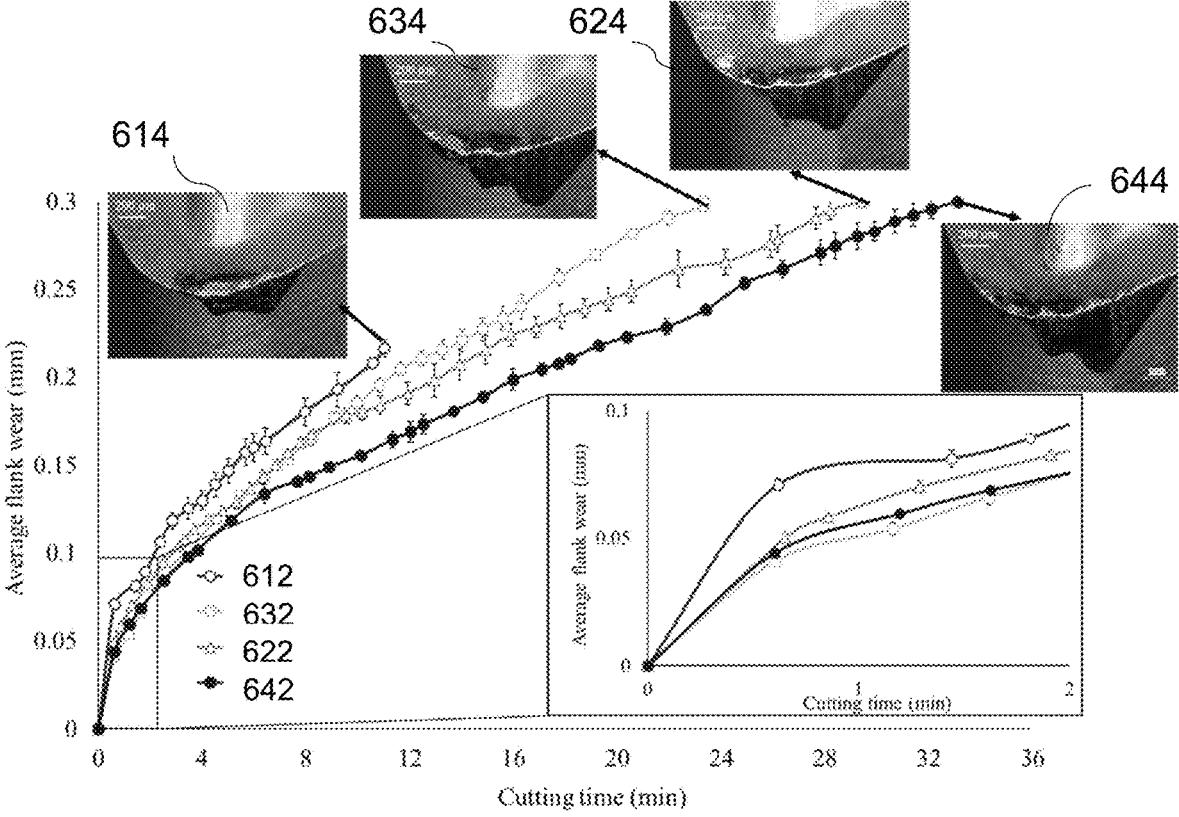
FIG. 6A is a graph of cutting tool flank wear versus cutting time for four example cutting tools.
Figure 6B:
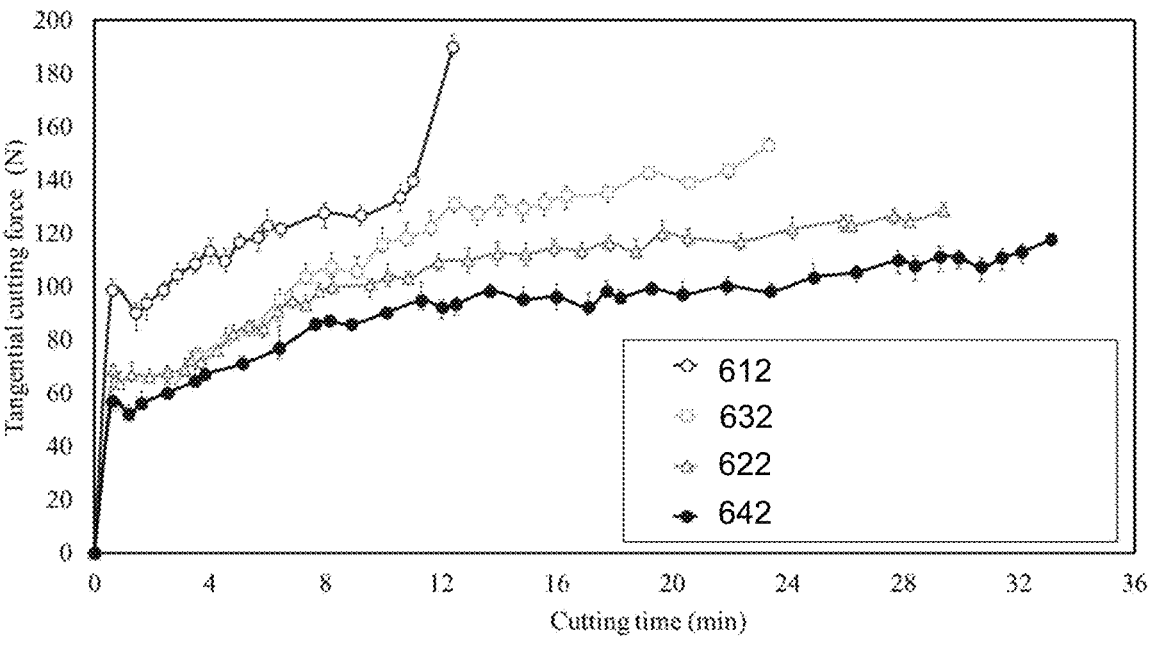
FIG. 6B is a graph of cutting tool force versus cutting time for four example cutting tools.

FIG. 6A depicts the flank wear by cutting time of tools 614, 624, 634, and 644. As above, tool failure occurs when the cutting tool has chipped or a flank wear of 0.3 mm occurs. FIG. 6B shows the tangential cutting force variation compared to the cutting time for tools 614, 624, 634, and 644. As machining time rises along with the tool wear, the cutting force gradually does as well.

Figure 6C:
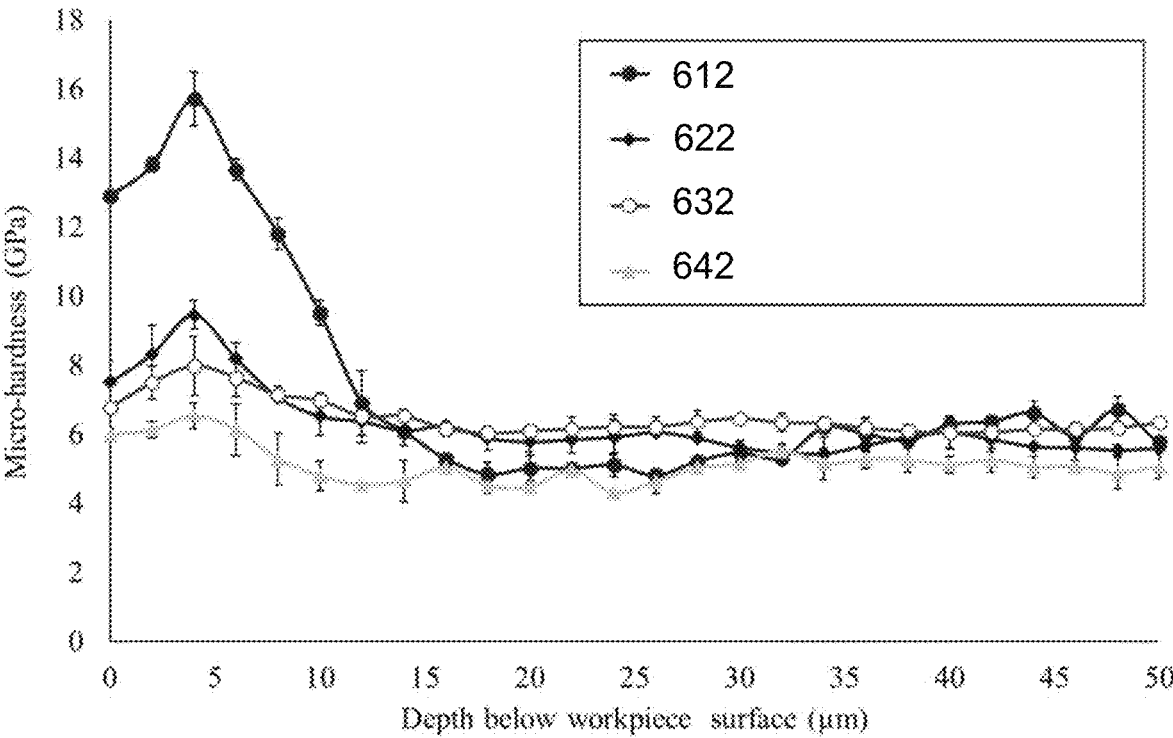
FIG. 6C is a graph of the hardness of a cut target workpiece by depth below the workpiece surface following machining by four example cutting tools.

Following machining until tool failure, the hardness of the workpiece machined by tool 614 was measured to be 13 GPa at the surface, and it increased to 15.7 GPa at 4 μm below the surface. The hardness decreased gradually from 15.7 GPa at around 4 μm to 5.5-6 GPa at around 15 μm. As shown in FIG. 6C, the maximum hardness of the surface machined with tool 614 was around two times higher than tools 624, 634, or 644.

Figure 6D:
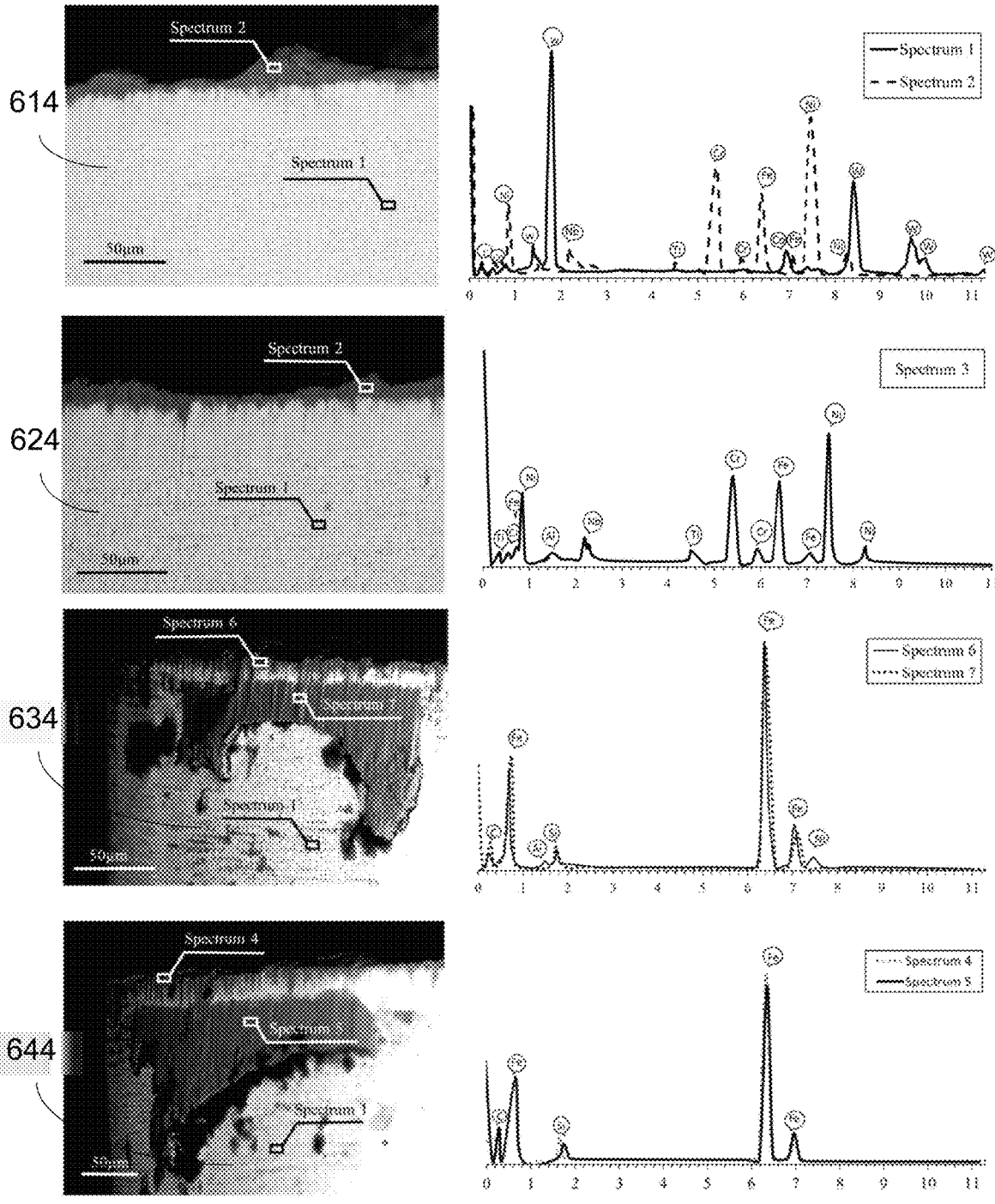
FIG. 6D are images and graphs showing XPS spectra of four example cutting tools.

FIG. 6D depicts spectra for, from top to bottom, tool 614, tool 624, tool 634, and tool 644. The spectra of FIG. 6D are taken after an initial turning pass of around 1 minute of cut of a product workpiece of Inconel 718 to provide information about the running-in stage of the tools. The worn tools were analyzed using the backscattered electrons (BSE) microscopy and energy dispersive electron spectroscopy (EDS) to assess the tool surface after a short cut was made on the Inconel alloy. For all the inserts, spectrum 1 represents the tool base material and is used as the basis of comparison. As can be seen, it is mainly composed of W and C, which are the main components of the substrate of the tools. As shown in the EDS results for tool 614 and tool 624, the traces of workpiece material were found on the tool flank and rake face (making the built up edge). As shown in the second row of FIG. 6D, the thermal barrier properties of the aluminum silicon layer deposited between the tool-chip interface decreased the amount of built up edge formation on the tool edge.

As shown in FIG. 6D, the volume of the built up edge in tool 624 (region shown with spectrum 3) was lower than tool 614 (region shown with spectrum 2) after one pass. Poor thermal properties of Inconel 718 were the main reasons for the high temperature and pressure conditions that may result in built up edge formation. Extensive adhesion was due to high friction, high temperatures, and contact pressures. The tendency of Inconel to form a large built up edge in the initial stage of cutting plays an important role in tool failure and chipping during the subsequent passes. Lower built up edge formation is associated with a decrease in the probability of crack development and propagation.

The BSE images and EDS analysis of tool 634 and 644 after one pass of machining of Inconel 718 are also shown in the third and fourth rows, respectively, of FIG. 6D. As can be seen, a high amount of graphite is found on the tool, close to the tool tip and also on the tool flank face. The existence of graphite provides a lubricious film at the tool-chip interface due to its low shear strength. This lubricious layer reduces friction in the cutting zone. Since there was almost no sign of the Ni, Cr in the EDS analysis of spectrum 4, cast iron can be understood to prevent the sticking of Inconel 718 to the cutting edge and facilitate chip flow over the tool edge. Therefore, by depositing a cast iron layer on the tool tip before machining with Inconel 718, the formation of built up edge was significantly reduced. The tool wear behavior of tool 644 was almost the same as tool 634. For tool 644, in addition to the graphite in cast iron improving the material flow, the presence of aluminum under the cast iron was found to protect the tool from the initial force and thus reduce the propensity of tool 644 to chip.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

I claim:

1. A method of producing a machined product workpiece with a cutting tool having a coating adhered to a cutting surface of a substrate of the cutting tool in a solid state, the method comprising:

receiving a premachining workpiece, the premachining workpiece formed of a material including a soft metal, the soft metal having a hardness lower than a hardness of the substrate;

machining the premachining workpiece with the cutting tool by cutting the premachining workpiece to a first depth with the cutting tool such that a layer of the coating material adheres to the cutting surface of the cutting tool in the solid state to form the coating, the coating material including between 50 and 95 percent by total weight of the coating aluminum and between 5 and 50 percent by total weight of the coating silicon; and after forming the coating on the cutting surface of the cutting tool, machining a product workpiece by cutting the product workpiece to a second depth with the cutting tool having the coating to produce the machined product, the coating melting and functioning as an in-situ liquid lubricant as the cutting tool is machining the product workpiece, the product workpiece and the coating material being different materials, the product workpiece being a nickel-based super alloy.

2. The method of claim 1, wherein machining the premachining workpiece includes at least one machining pass.

3. The method of claim 1, further comprising, following the machining of the premachining workpiece, machining a second premachining workpiece formed of a second coating material including a plurality of spherical graphite particles, a layer of the second coating material adhering to the cutting surface of the cutting tool in a solid state.

4. The method of claim 1, wherein the product workpiece is Inconel 718.

5. The method of claim 1, wherein the coating material has a lower melting point than the substrate of the cutting tool.

6. The method of claim 1, wherein the coating material is capable of operating at a temperature up to 1200° C. at atmospheric pressure.

*     *     *     *     *